(12) United States Patent
Eichholz et al.

(10) Patent No.: US 8,973,867 B2
(45) Date of Patent: Mar. 10, 2015

(54) FRESH AIR INLET FOR AN AIRCRAFT

(75) Inventors: Johannes Eichholz, Hamburg (DE); Jens Beier, Drestedt (DE); Alexander Solntsev, Hamburg (DE); Ruediger Schmidt, Fredenbeck (DE)

(73) Assignee: Airbus Operations GmbH (DE)

( * ) Notice: Subject to any disclaimer, the term of this patent is extended or adjusted under 35 U.S.C. 154(b) by 1136 days.

(21) Appl. No.: 12/994,911

(22) PCT Filed: May 27, 2009

(86) PCT No.: PCT/EP2009/056401
§ 371 (c)(1),
(2), (4) Date: Feb. 17, 2011

(87) PCT Pub. No.: WO2009/144234
PCT Pub. Date: Dec. 3, 2009

(65) Prior Publication Data
US 2011/0136425 A1 Jun. 9, 2011

Related U.S. Application Data

(60) Provisional application No. 61/130,451, filed on May 30, 2008.

(30) Foreign Application Priority Data

May 30, 2008 (DE) .......................... 10 2008 026 117

(51) Int. Cl.
*B64D 33/02* (2006.01)
*B64C 7/00* (2006.01)
*B64D 13/00* (2006.01)

(52) U.S. Cl.
CPC . *B64D 33/02* (2013.01); *B64C 7/00* (2013.01); *B64D 13/00* (2013.01); *B64D 2033/022* (2013.01); *B64D 2241/00* (2013.01); *Y02T 50/44* (2013.01); *Y02T 50/56* (2013.01)
USPC .............................. 244/53 B; 454/76; 454/71

(58) Field of Classification Search
CPC ............. B64D 13/00; B64D 2033/022; B64D 2241/00; B64D 2033/0213; B64D 33/02; F02C 7/042
USPC ............ 244/53 B, 58; 454/76, 72, 71, 70, 73, 454/74, 75, 77
See application file for complete search history.

(56) References Cited

U.S. PATENT DOCUMENTS 2,391,838 A * 12/1945 Kleinhans et al. ............. 165/235
2,931,574 A *  4/1960 Zuiderhoek .................... 236/1 C (Continued)

FOREIGN PATENT DOCUMENTS

DE     10200459 A1    7/2003
DE     10361657 A1    8/2005

(Continued)

*Primary Examiner* — Benjamin P Lee
*Assistant Examiner* — Alexander V Giczy
(74) *Attorney, Agent, or Firm* — Lerner, David, Littenberg Krumholz & Mentlik, LLP

(57) ABSTRACT

A fresh air inlet for an aircraft features a ram air inlet with a ram air inlet opening, a secondary air inlet opening separate from the ram air inlet and a movably mounted flap. The flap can be moved into a first or second position, and essentially covers the secondary air inlet opening in the first position and at least partially opens the secondary air inlet opening and extends away from the aircraft body in the second position to shield the ram air inlet opening from foreign matter in the air. The secondary air inlet reduces the pressure loss of the air inlet on the ground or during flight phases with relatively slow speed due to the enlarged cross-sectional surface. The ram air inlet can be optimized for cruising phases, and the energy expenditure for any downstream compressors and flow-induced noises can be considerably reduced.

16 Claims, 11 Drawing Sheets

(56) References Cited

U.S. PATENT DOCUMENTS

Figure 1:
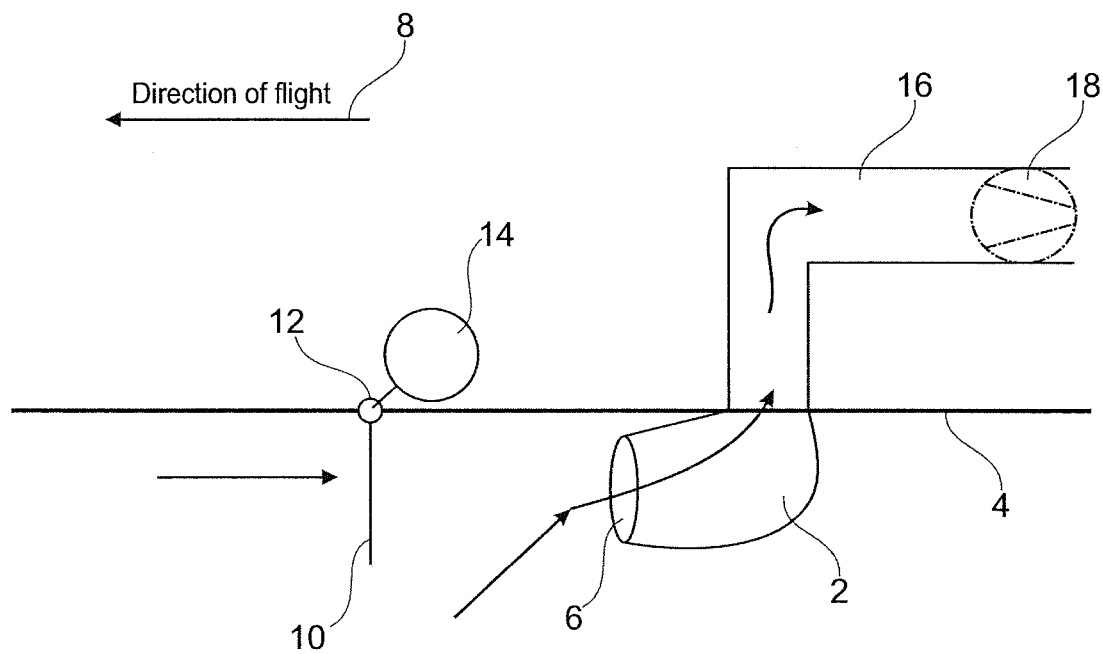

| | | | |
|---|---|---|---|
| 3,045,983 A * | 7/1962 | Best | 165/235 |
| 3,511,161 A * | 5/1970 | Schindelman | 454/71 |
| 3,568,694 A | 3/1971 | Johnson | |
| 4,285,466 A * | 8/1981 | Linscheid et al. | 236/13 |
| 4,674,704 A | 6/1987 | Altoz et al. | |
| 5,165,228 A * | 11/1992 | Enderle | 60/244 |
| 6,244,952 B1 * | 6/2001 | Arold et al. | 454/145 |
| 6,901,737 B2 * | 6/2005 | Schnoor | 60/39.83 |
| 7,014,144 B2 * | 3/2006 | Hein et al. | 244/53 B |
| 2003/0183272 A1 | 10/2003 | Schnoor | |
| 2004/0144097 A1 | 7/2004 | Grimlund | |
| 2007/0117501 A1 | 5/2007 | Solntsev et al. | |
| 2008/0099631 A1 * | 5/2008 | Parikh et al. | 244/53 B |

FOREIGN PATENT DOCUMENTS

| | | |
|---|---|---|
| DE | 102007052817 A1 | 5/2009 |
| EP | 1916185 A2 | 4/2008 |
| GB | 785721 A | 11/1957 |
| GB | 2176570 A | 12/1986 |
| RU | 2088486 C1 | 8/1997 |
| WO | WO 2005063579 A1 * | 7/2005 |
| WO | WO 2007054206 A1 * | 5/2007 |
| WO | 2008115273 A2 | 9/2008 |

* cited by examiner

FRESH AIR INLET FOR AN AIRCRAFT

CROSS-REFERENCE TO RELATED APPLICATIONS

This application is a national phase entry under 35 U.S.C. §371 of International Application Ser. No. PCT/EP2009/056401, filed May 27, 2009, published in German, which claims the benefit of the filing date of United States Provisional Patent Application No. 61/130,451, filed May 30, 2008, and of German Patent application Ser. No. 10 2008 026 117.3, filed May 30, 2008, the entire disclosures of which are hereby incorporated herein by reference.

FIELD OF THE INVENTION

The invention relates to a fresh air inlet for an aircraft.

BACKGROUND OF THE INVENTION

Commercial aircraft require a fresh air supply. This air can be provided by various sources such as an engine compressor, an auxiliary power unit ("APU") or other sources. It is common practice to supply environmental control systems in larger aircraft with bleed air from aircraft engines. Air-conditioning units of popular aircraft environmental control systems comprise one or more large-volume heat exchangers, through which ram air flows during the flight. The ram air is used for cooling the bleed air. The ram air is usually supplied through ram air ducts. Relatively modern commercial aircraft are provided with environmental control systems that can be operated without or with relatively little bleed air. In order to provide the relatively large air quantities required for pressurizing, ventilating and air-conditioning the cabin, it is practical to utilize relatively large fresh air inlets on the fuselage of the aircraft. Such fresh air inlets usually extend outward from an outer contour of the aircraft fuselage and have, for example, a curved, scoop-like shape that is also referred to as "ram air scoop" or "ram air inlet scoop."

The shape of this type of fresh air inlets is designed for the cruising state that by far represents the longest flight phase, particularly for long-range commercial aircraft. In these flight phases, a relatively high speed of, for example, 0.8 Ma is reached such that a pronounced ram pressure is generated at the fresh air inlets despite the low air density at cruising altitude. The air flowing into an air duct arranged behind the fresh air inlet due to the ram pressure is preferably compressed further with the aid of a compressor in order to increase the air pressure to the value required for pressurizing the cabin and fed into a downstream network of ducts, from where it can be routed into the corresponding air treatment systems. In order to fulfill the specified acoustic requirements during ground operations—a certain air speed should, in particular, not be exceeded—and to minimize the pressure loss so as to save energy, it may be required to install one or more secondary air inlets that provide additional inflow cross sections on the ground in order to thusly reduce the flow resistance and to lower the average flow speed. However, the operation of these secondary air inlets requires mechanically actuated flaps or shutters that seal the secondary air inlets during the flight.

In the use of the above-described fresh air inlets, it is furthermore disadvantageous that these fresh air inlets need to be protected from dust and small objects being swirled around during operating phases near the ground, wherein this is usually realized with a deflector shield. This deflector shield is arranged, for example, in a pivoted fashion upstream of the fresh air inlet referred to the flow direction and able to absorb the kinetic energy of the foreign matter. This additional mechanical device increases the complexity of such a fresh air inlet system.

It is the object of the invention to propose a fresh air inlet for an aircraft that has the lowest complexity possible, a low weight and the fewest movable parts possible and ensures a sufficient supply of fresh air for an environmental control system of an aircraft that essentially operates without bleed air during flight and ground operations, namely with the lowest possible power demand of a downstream compressor.

This object is attained with a fresh air inlet for an aircraft that features at least one ram air inlet with at least one ram air inlet opening, at least one secondary air inlet opening that is spaced apart from the ram air inlet and at least one movably mounted flap, wherein the flap can be moved into a first position and into a second position, and wherein the flap essentially covers the secondary air inlet opening in the first position and at least partially opens the secondary air inlet opening and at least in certain areas extends into the air flow directed toward the ram air inlet opening in order to shield the ram air inlet opening from foreign matter in the second position.

In the fresh air inlet according to the invention, a deflector shield required for the ram air inlet is realized in the form of the flap that simultaneously serves for covering another secondary air inlet opening. The first position of the flap is assumed in flight phases, in which a relatively high flying speed is reached and the aircraft is located far above the ground. The secondary air inlet opening could be realized, for example, in the form of an opening that is located directly in an outer surface of the aircraft. This opening could be arranged, in particular, in an area on the underside of the aircraft fuselage, wherein it would be possible to realize, for example, an opening in the fairing of the wing-fuselage transition ("belly fairing"). In order to cover the secondary air inlet opening, the flap fits tightly against the edges of the secondary air inlet opening such that a largely smooth, continuous surface is created when the secondary air inlet opening is closed. In this case, the ram air inlet is not impaired by the flap such that the entire surface of the ram air inlet opening is available for taking in ram air.

In the second position of the flap, the secondary air inlet opening is not covered by the flap such that the entire secondary air inlet opening is available for taking an air from the surroundings. When the aircraft is on the ground and the environmental control system is switched on, air can be taken in from the surroundings through the secondary air inlet opening, as well as through the ram air inlet, and used by the environmental control system. In this context, it needs to be observed that the flap should be positioned at a sufficient distance from the ram air inlet such that no or only minimal fluidic influences occur between the secondary air inlet opening and the ram air inlet during ground operations. At slow speeds such as, for example, during takeoffs and landings of the aircraft, a considerably enlarged inlet opening for ambient air is also available for the ram air inlet due to the combination of a secondary air inlet flap and a deflector shield according to the invention.

The fresh air inlet according to the invention has a number of advantages in comparison with fresh air inlets known from the prior art. On the one hand, the pressure loss of the fresh air inlet can be reduced due to the increased cross-sectional surface on the ground or in flight phases with relatively slow speed. This results in a considerably lower energy expenditure for any downstream compressors or blowers. In addition, the intensity of flow-induced noises is reduced due to the more favorable flow characteristics. It is furthermore particularly preferred to essentially design the ram air inlet such that it is only used while cruising. Consequently, it is not necessary to make any compromises that would deteriorate the flow characteristics while cruising for the benefit of ground operations.

In one advantageous embodiment of the fresh air inlet according to the invention, the secondary air inlet opening is situated upstream of the ram air inlet. This favorably affects the simultaneous use of the flap as a cover for the secondary air inlet opening and as a deflector shield for the ram air inlet. This results from the fact that an upstream secondary air inlet opening is passed by the surrounding air flow first such that a flap for closing the secondary air inlet opening that is arranged in the vicinity of the secondary air inlet opening can be easily extended into the air flow flowing directly to the ram air inlet.

In an advantageous additional development of the invention, the flap is essentially located upstream of the ram air inlet and the secondary air inlet opening in its second position. This means that the entire air inlet surface between the flap and the ram air inlet is made available on the ground and the influence of the ram pressure on the secondary air inlet opening is minimized at slow speeds. This likewise makes it possible to realize a relatively large distance between the flap and the ram air inlet opening such that less fluidic interference effects occur at the ram air inlet.

In another advantageous additional development of the air inlet according to the invention, the flap is essentially located between the ram air inlet and the secondary air inlet opening in its second position. This makes it possible to reduce fluidic interferences between the air introduced into the secondary air inlet opening and the air flowing into the ram air inlet opening. In this case, it is particularly practical to adapt the flap to the shape of the ram air inlet because this could favorably affect a shorter distance of the flap from the ram air inlet and a reduced influence on the flow such that the secondary air inlet opening could also be positioned relatively close in front of the ram air inlet in order to reduce the flow resistances of downstream air ducts. Another favorable effect of this arrangement is described further below with reference to another advantageous additional development.

A preferred embodiment of the fresh air inlet according to the invention furthermore features a secondary air inlet duct that is connected to the secondary air inlet opening, as well as a ram air inlet duct that is connected to the ram air inlet opening and a fresh air duct, wherein the secondary air inlet duct and the ram air inlet duct can be connected to the fresh air duct. This makes it possible to combine the flows in the secondary air inlet opening and the ram air inlet such that the entire air taken in from the surroundings is available in a common fresh air duct and can be withdrawn, for example, by an environmental control system of the aircraft.

It is furthermore preferred that the flap can be moved into a third position, in which the flap at least partially extends into the air flow in order to route ram air into the secondary air inlet opening from a surface of the aircraft and at the same time essentially not impair the air flow that is directed toward the ram air inlet opening. Due to this constellation that is favorably affected, in particular, by a flap arranged between the secondary air inlet opening and the ram air inlet, an additional mass flow can be generated in certain flight phases and routed into the secondary air inlet opening in flight by means of the ram pressure. In this operating mode of the air inlet according to the invention, the flap is opened just so far that it does not yet impair the air flow directed toward the ram air inlet opening, but already protrudes into the air flow by such a distance that a clearly noticeable mass flow induced by the ram pressure is introduced into the secondary air inlet opening. This operating mode is referred to as "boost mode" below.

It is furthermore advantageous if the fresh air inlet according to the invention features a check valve that is arranged in the secondary air inlet duct. This makes it possible to prevent the air flow taken in through the ram air inlet from flowing back into the surroundings of the aircraft through the secondary air inlet opening due to the relatively high ram pressure at the ram air inlet, particularly when the secondary air inlet opening is closed. Since the secondary air inlet opening is merely subjected to the static ambient pressure but the ram air inlet opening is subjected to the dynamic ram pressure, a concise pressure differential would form between the two openings and could only be compensated with a very strong suction effect in the fresh air duct if no check valve would be provided.

It is furthermore preferred that the cross-sectional surface of the fresh air duct is at least identical to the sum of the cross-sectional surfaces of the secondary air inlet duct and the ram air inlet duct. This prevents the mass flow flowing into the fresh air duct from being subjected to an increased flow resistance and pressure peaks or vibration effects from occurring at the inlet of the fresh air duct.

In one particularly preferred embodiment of the air inlet according to the invention, an emergency ventilation duct is provided and can be connected to the secondary air inlet duct. In this way, it is possible to create or boost an emergency ventilation system that allows an emergency ventilation of the cabin on the basis of ram air being taken in. This leads to an additional reduction of the weight. The combination of secondary air inlet opening, ram air inlet and emergency ram air inlet is particularly advantageous when the flap is in its third position and additional ram air from the surroundings is also available through the secondary air inlet opening It is furthermore particularly advantageous if a movably mounted emergency ventilation inlet flap is arranged in the emergency ventilation duct and deactivates the emergency ventilation through the secondary air inlet opening and the ram air inlet during the normal operation of the aircraft, wherein this emergency ventilation can, however, be reactivated on demand by opening the emergency ventilation inlet flap.

It is also preferred that the air inlet according to the invention furthermore features an actuator for moving the emergency ventilation inlet flap in order to open or close the connection between the emergency ventilation duct and the secondary air inlet duct. This would make it possible to automatically open the emergency ventilation inlet flap at the push of a button or automatically with a suitable controller or control unit.

In an advantageous embodiment of the fresh air inlet according to the invention, a compressor for conveying air is located in the fresh air duct. The compressor is primarily required for compressing the fresh air due to the differential pressure of about 0.5 bar or more between the surroundings of the aircraft and the cabin while cruising, as well as the ducts and air treatment systems that create an additional flow resistance. Since the entire inlet opening surface of the secondary air inlet opening and the ram air inlet opening is available, the compressor can have a relatively low power demand in comparison with the prior art because the flow resistance is clearly reduced due to the relatively large inlet opening surface.

It is furthermore advantageous if the flap is pivotably mounted on a hinge. This is particularly simple with respect to mechanical considerations and can be realized with numerous commercially available, perfected and low-maintenance components.

It is also particularly advantageous if the fresh air inlet according to the invention features an actuator for moving the flap that may be realized in the form of an electric, hydraulic or pneumatic actuator. This actuator could be positioned in the immediate vicinity of the flap and reduces the expenditures for mechanical actuating elements.

It is ultimately also advantageous if the fresh air duct, the ram air inlet duct and/or the secondary air inlet duct is designed for accommodating at least one heat exchanger. In this way, the need for additional structural space and the expenditures for integrating a heat exchanger of the environmental control system or other systems can be eliminated. This measure is primarily suitable for relatively small systems that do not impair the main function of the fresh air inlet and for which the air flow provided in the respective duct suffices.

The objective is ultimately also attained with the use of a fresh air inlet according to the above-described characteristics in an aircraft. The objective is furthermore attained with an aircraft with at least one above-described fresh air inlet according to the invention.

SHORT DESCRIPTION OF THE DRAWINGS

Figure 2:
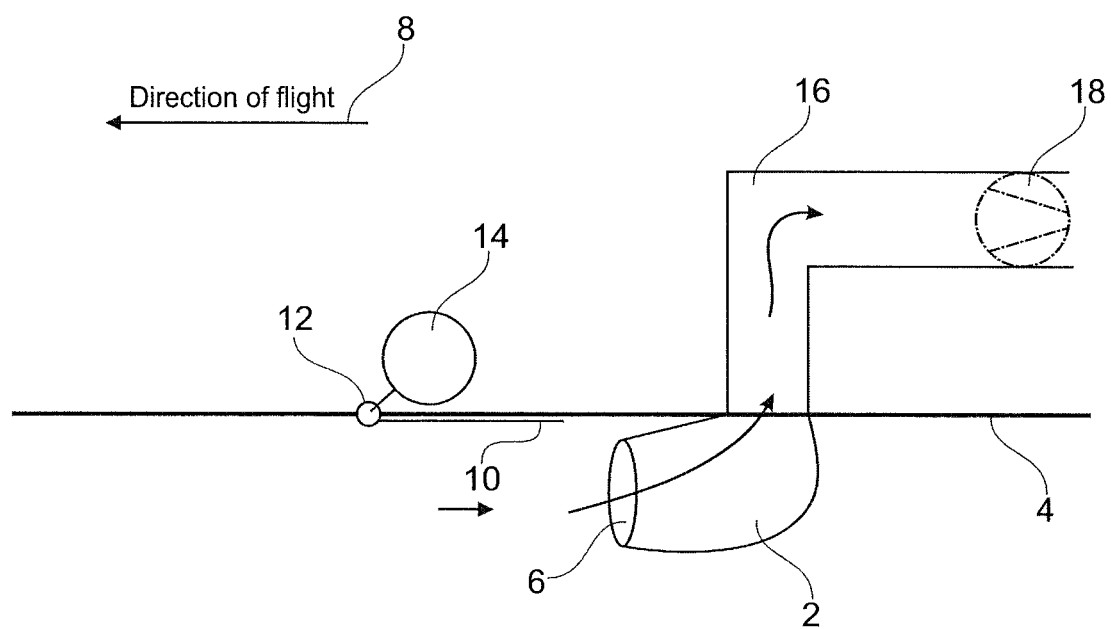
Figure 3:
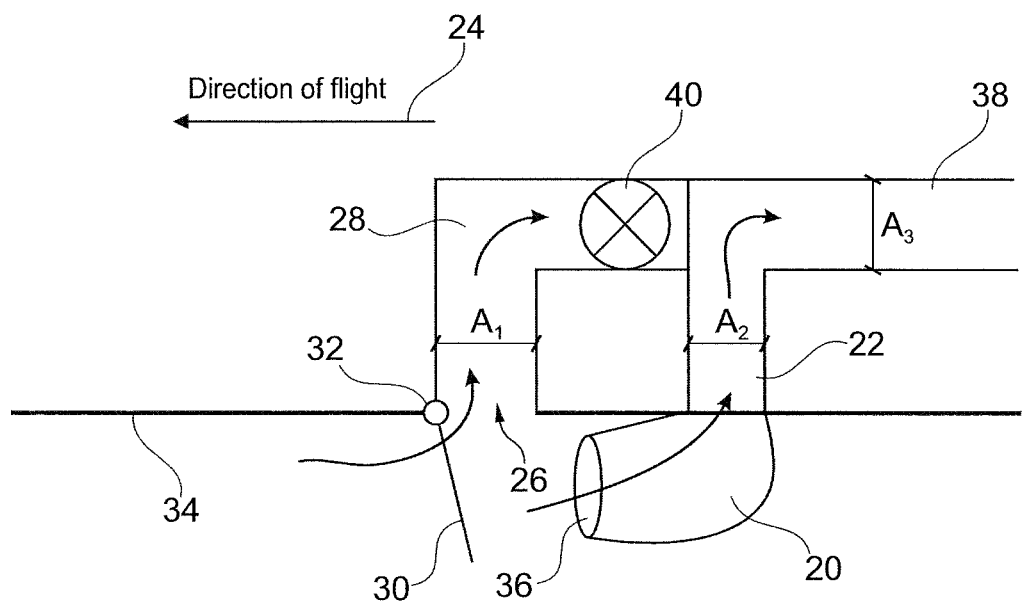
Figure 4:
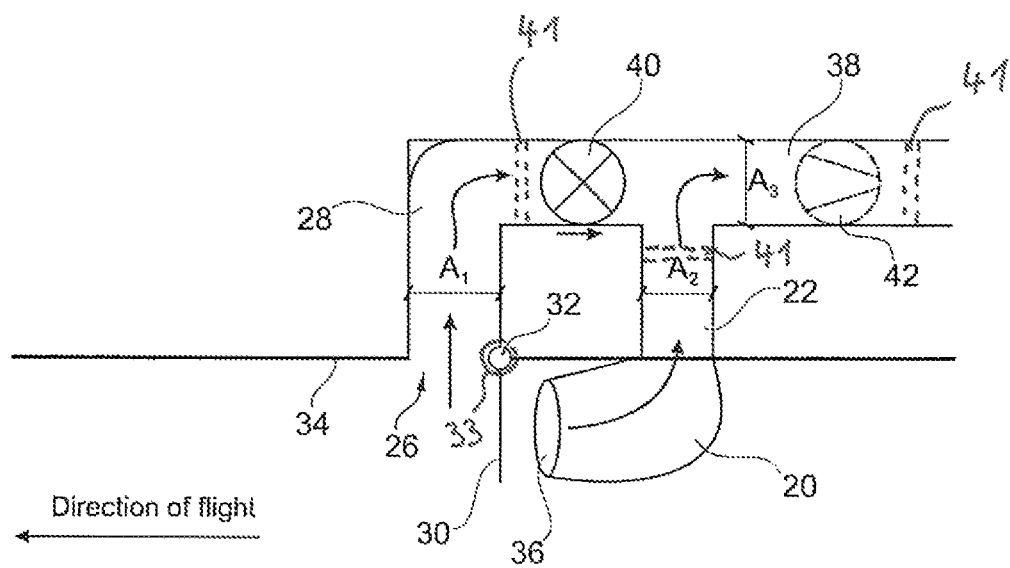
Figure 5:
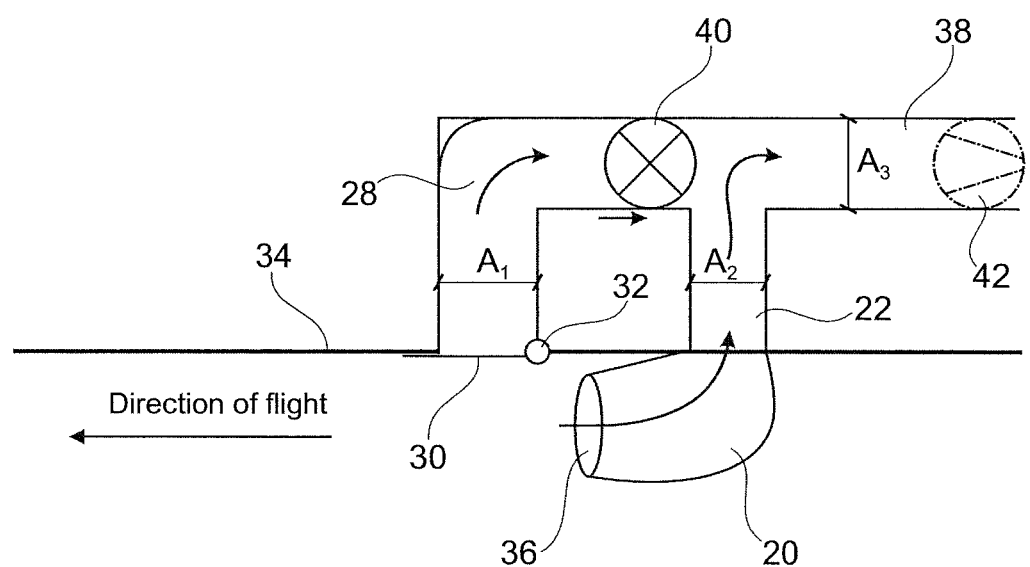
Figure 6:
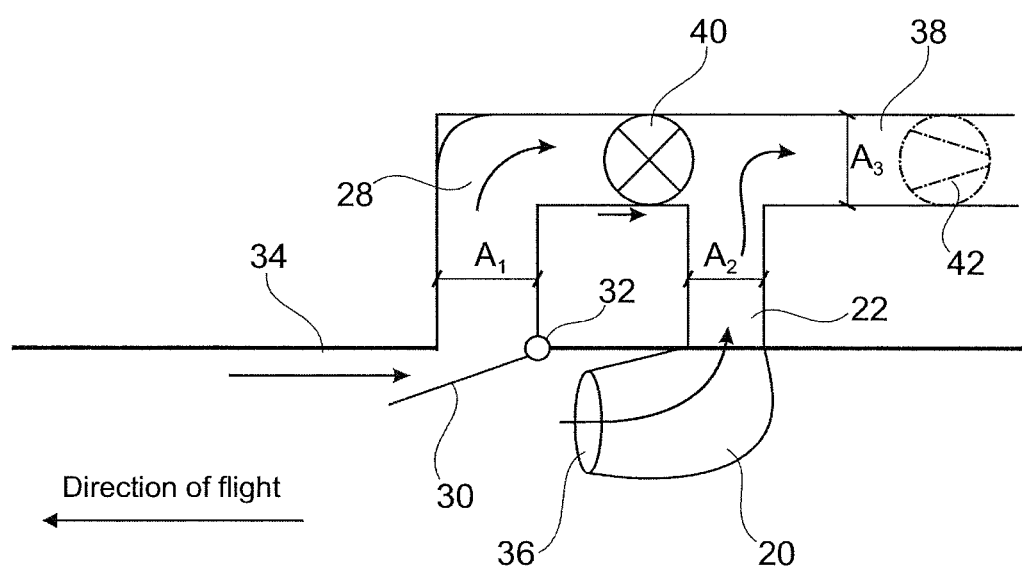
Figure 7:
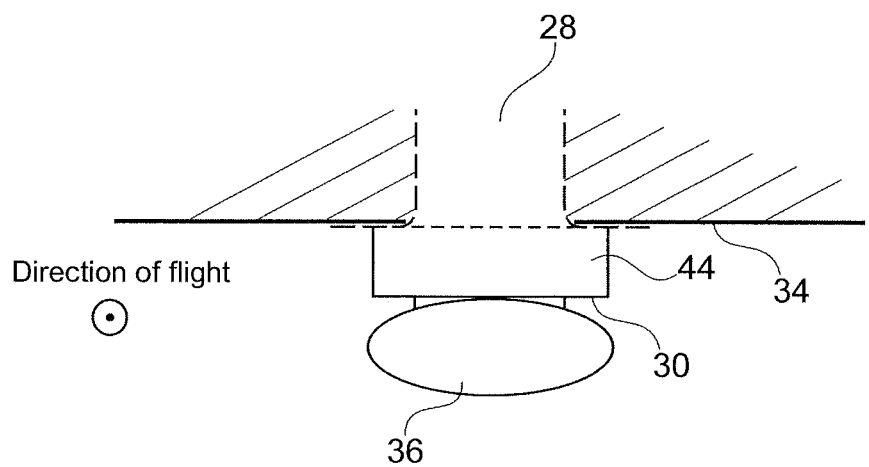
Figure 8:
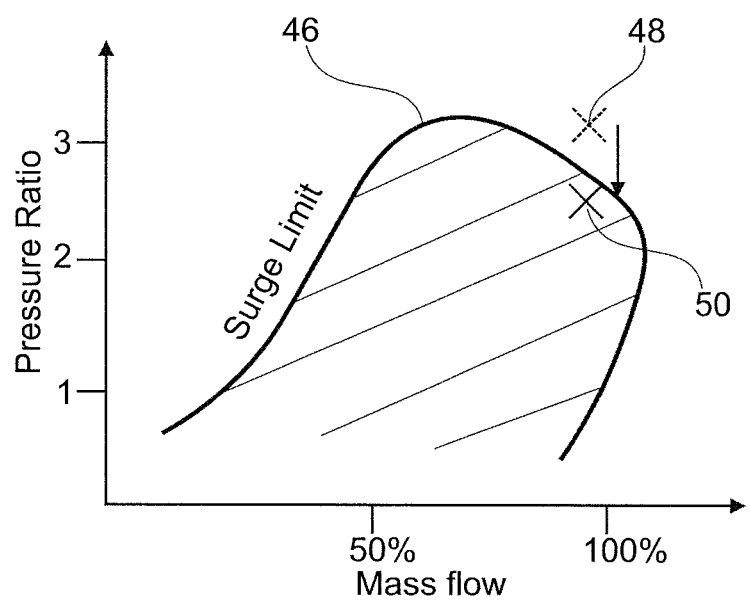
Figure 9:
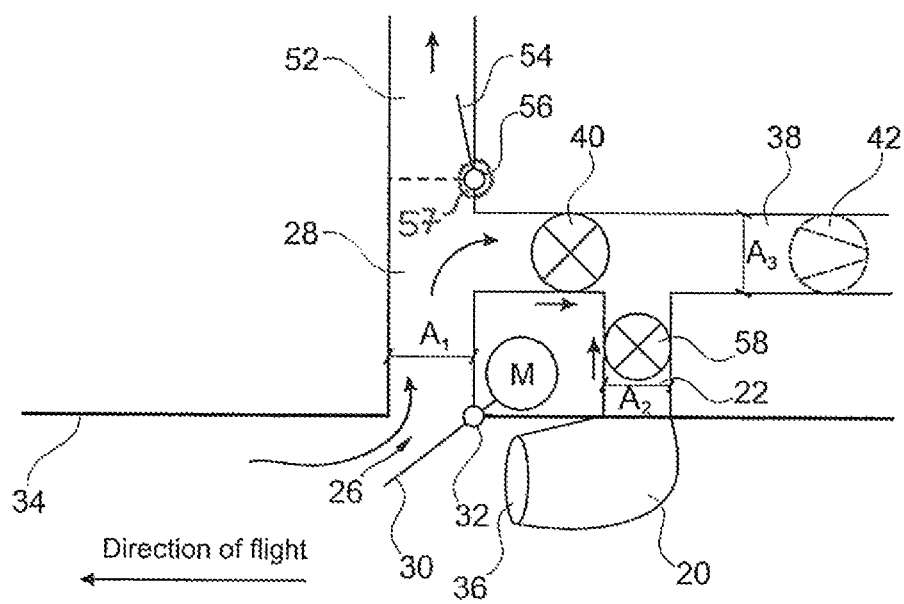
Figure 10:
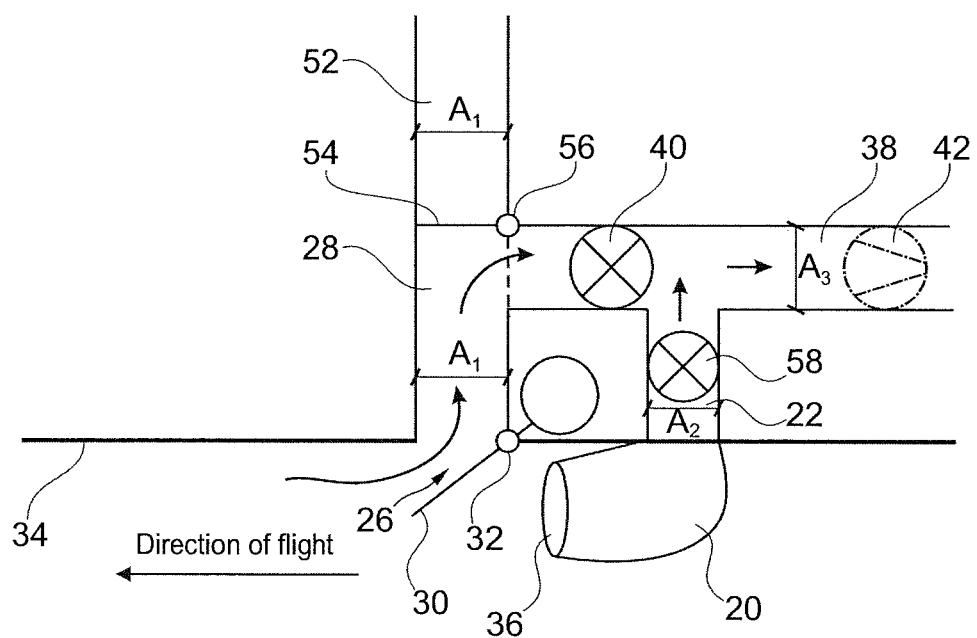
Figure 11A:
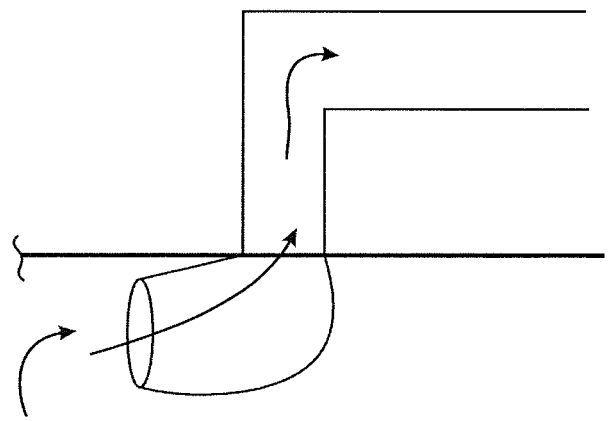
Figure 11B:
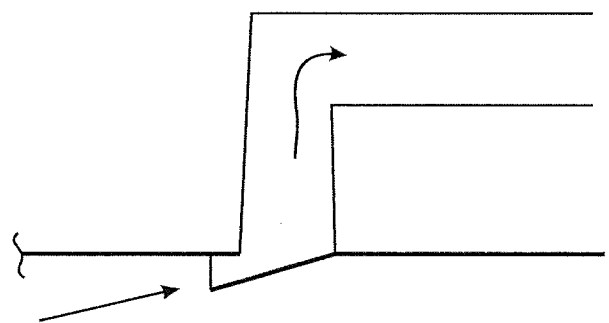
Figure 11C:
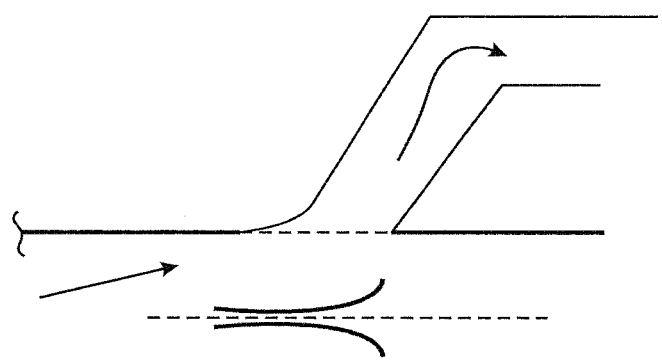

Other characteristics, advantages and possible applications of the present invention result from the following description of exemplary embodiments and the figures. In this respect, all described and/or graphically illustrated characteristics also form the object of the invention individually and in arbitrary combination regardless of their composition in the individual claims or their references to other claims. In the figures, identical or similar objects are furthermore identified by the same reference symbols. The figures show:

FIG. 1: a schematic representation of a fresh air inlet according to the prior art with extended deflector shield;

FIG. 2: a schematic representation of a fresh air inlet according to the prior art with retracted deflector shield;

FIG. 3: a first exemplary embodiment of the fresh air inlet according to the invention with extended flap;

FIG. 4: a second exemplary embodiment of the fresh air inlet according to the invention with extended flap;

FIG. 5: the second exemplary embodiment of the fresh air inlet according to the invention with retracted flap;

FIG. 6: the second exemplary embodiment with the flap in the boost mode;

FIG. 7: a schematic representation of the effective ram air surface of the second exemplary embodiment in the boost mode;

FIG. 8: a diagram for lowering the compressor power demand in the boost mode;

FIG. 9: a third exemplary embodiment of the fresh air inlet according to the invention;

FIG. 10: another schematic representation of the third exemplary embodiment with closed emergency ventilation inlet flap; and FIGS. 11a to c: an overview of different realizable ram air inlet shapes.

DETAILED DESCRIPTION OF EXEMPLARY EMBODIMENTS

FIG. 1 shows a fresh air inlet 2 according to the prior art that is located, for example, on the underside of an aircraft fuselage 4. The fresh air inlet 2 features a ram air inlet opening 6 that points in the direction of flight 8. A deflector shield 10 is arranged upstream of the ram air inlet opening 6 and mounted on the aircraft fuselage 4 such that it can be pivoted about a hinge 12. An actuator 14 is connected to the deflector shield 10 in order to realize the pivoting movement thereof. In the illustration shown, the deflector shield 10 is extended and protrudes outward from the surface of the aircraft fuselage 4. Objects that move toward the ram air inlet 2 opposite to the direction of flight 8 are held back by the deflector shield 10. These objects may consist, for example, of foreign matter in the form of the particles, dust or the like. A ram air duct 16 is connected to the fresh air inlet 2 in order to convey ram air introduced into the ram air inlet 2 through the ram air inlet opening 6. A compressor 18 located within this ram air duct 16 serves for taking in air from the surroundings during ground operations and for compressing the ram air being taken in and conveying this ram air to an environmental control system or the like during flight operations.

FIG. 2 once again shows the arrangement according to FIG. 1, but the deflector shield 10 is retracted in FIG. 2. Due to this measure, the ram air inlet opening 6 is able to take in ram air from the surroundings without being impaired by the deflector shield 10. This is the case while cruising, namely when objects are not expected to fly around and damages to the ram air inlet 2 essentially can be precluded.

FIG. 3 shows a first exemplary embodiment of the fresh air inlet according to the invention. This figure shows a ram air inlet 20 that is connected to a ram air inlet duct 22. A secondary air inlet opening 26 that is connected to a secondary air inlet duct 28 is arranged adjacently in the direction of flight 24, i.e., upstream. A flap 30 is arranged upstream of the secondary air inlet opening 26 and pivotably mounted on an outer surface 34 of the aircraft by means of a hinge 32. In the example shown, the flap 30 extends outward from the outer surface 34 of the aircraft and therefore is located in the air flow directed toward a ram air inlet opening 36. The secondary air inlet duct 28 and the ram air inlet duct 22 are connected to a fresh air duct 38, wherein the cross-sectional surface (A3) of the fresh air duct 38 at least corresponds to the sum of the surfaces of the secondary air inlet duct 28 (A1) and the ram air duct 22 (A2). In this way, a largely optimal continuity of the flow from the two different sources shown is realized.

The constellation shown with the extended flap 30, the opened secondary air inlet opening 26 and the ram air inlet 20 arranged downstream of the flap 30 applies, in particular, to the situation on the ground or during takeoffs and landings of the respective aircraft. In this case, the flap 30 acts as a deflector shield as described above with reference to the prior art in FIGS. 1 and 2. Since the ram air inlet opening 36 is subjected to no ram pressure or only a low ram pressure on the ground or when the aircraft flies near the ground at slow speeds, the available inlet opening surface for taking in pressure from outside can be considerably enlarged due to the extended flap 30. This lowers the flow resistance at the air inlet point into the aircraft such that the power demand of a not-shown compressor can be reduced.

FIG. 3 furthermore shows a check valve 40 that serves for preventing ram air flowing into the ram air inlet opening 36 from once again flowing back into the surroundings through the secondary air inlet duct 28 and the secondary air inlet opening 26. This backflow could occur when the aircraft is in motion and the ram air inlet opening 36 is subjected to a noticeable ram pressure such that the overall pressure at the ram air inlet opening 36 exceeds the static ambient pressure at the secondary air inlet opening 26.

FIG. 4 shows a second exemplary embodiment, in which the flap 30 and the hinge 32 and rotary actuator 33 are located between the secondary air inlet opening 26 and the ram air inlet opening 36. This figure also shows a constellation that is used while the aircraft is on the ground or during takeoffs and landings. The flap 30 serves as a deflector shield for the ram air inlet 20 and prevents objects that are swirled around and could destroy the ram air inlet 20 from being taken in.

FIG. 4 furthermore shows a blower or compressor 42 that conveys the air from the two openings 26 and 36 to an environmental control system or another consumer via the fresh air duct 38. Possible heat exchanger positions are labelled 41.

FIG. 5 shows the second exemplary embodiment with a closed flap 30 as it is used during normal cruising. The outer surface 34 is as smooth as possible in the region of the secondary air intake opening 26 such that no additional flow resistances are created in this region and the ram air inlet 20 can take in ram air from the surroundings in an unimpaired fashion.

Another variation of the operation of the second exemplary embodiment is illustrated in FIG. 6. In this case, the flap 30 is in a third position that lies between a completely closed position (the "first position") and a completely extended position (the "second position"). The flap 30 is extended just so far that the ram air inlet 20 is able to take in ram air from the surroundings in a largely or essentially unimpaired fashion, wherein the flap 30 extends, however, into the air flow such that an additional ram air effect is exerted upon the secondary air inlet opening 26. The overall effective ram air surface of the air inlet according to the invention therefore is larger than merely the surface of the ram air inlet opening 36.

The increase of the effective ram air surface is elucidated with reference to the schematic illustration in FIG. 7. In a section perpendicular to a longitudinal axis of the aircraft, it becomes clear that the original ram air surface formed by the ram air inlet opening 36 can be additionally enlarged with a flap 30 that is in the third position. In a top view of the ram air inlet 20, the edge of the flap 30 that faces away from the outer surface 34 of the aircraft is located on the upper edge of the ram air inlet opening 36 and forms another ram air surface 44 that extends up to the outer surface 34 of the aircraft. In this way, the ram pressure upstream of the compressor 42 can be increased such that the compressors can be designed for a smaller range of pressure ratios than variations known from the prior art. A cabin compressor frequently reaches its performance limits, particularly at a maximum differential pressure between the passenger cabin and the surroundings. The fresh air inlet according to the invention can reduce the required power and pressure peaks by utilizing this so-called "boost mode." This applies, in particular, to single-stage compressors with fixed blade geometry that are preferred for use in aircraft due to their simplicity and robustness.

Due to the additional ram pressure that is generated by means of the increased ram air surface realized with the partially opened flap 30, a permissible pressure ratio of the cabin compressor is achieved. This is furthermore illustrated in FIG. 8 with the aid of a diagram that shows the mass flow as a function of the pressure ratio of the compressor. A surge limit 46 defines the performance limits of a compressor and depends on the mechanical design thereof. This diagram shows, for example, that the increase of the effective ram air surface achieved with the flap 30 makes it possible to lower the pressure ratio from the operating point 48 to a new operating point 50 that lies within the realizable range below the surge limit 46 of the compressor used.

FIG. 9 shows a third exemplary embodiment of the air inlet according to the invention. In this case, an additional emergency ventilation duct 52 is integrated and connected to the secondary air inlet duct 28. An emergency ventilation inlet flap 54 is located between the emergency ventilation duct 52 and the secondary air inlet duct 28 and movably mounted on a hinge 56 with rotary actuator 57 within the emergency ventilation duct 52. Due to the arrangement shown, air can also be introduced into the emergency ventilation duct 52 through the secondary air inlet opening 26, particularly when the flap 30 is in the "boost mode." In this arrangement, it should be particularly emphasized that an additional check valve 58 is arranged within the ram air inlet duct 22. In this way, ram air taken in through the secondary air inlet opening 26 is prevented from flowing back through the ram air inlet opening 36.

The emergency ventilation inlet flap 54 within the emergency ventilation duct 52 may be realized in the form of a three-way valve such that a total of three different operating modes are available. On the one hand, the emergency ventilation inlet flap 54 may be in its position illustrated in FIG. 9 such that ram air is introduced into the fresh air duct 38 and into the emergency ventilation duct 52 through the secondary air inlet opening 26.

FIG. 10 shows another position of the emergency ventilation inlet flap 54 of the emergency ventilation duct 52, in which the ram air flowing into the secondary air inlet opening 26 cannot be introduced into the emergency ventilation duct 52, but rather is routed to the fresh air duct 38 only. It would further more be possible to realize an embodiment, in which the emergency ventilation inlet flap 54 of the emergency ventilation duct 52 is moved into another position that blocks the connection between the secondary air inlet opening 26 and the fresh air duct 38 such that ram air from the secondary air inlet opening 26 can only be introduced into the emergency ventilation duct 52.

The arrangement according to FIGS. 9 and 10 has the advantage that additional fuselage openings and ram air flaps for the emergency ventilation inlet can be eliminated. This reduces the weight, the installation space and the direct costs. In addition, duct or pipe sections can be eliminated because they can be used for several functions such as, for example, secondary air supply and emergency ventilation.

In conclusion, FIGS. 11a to 11c show possible shapes of ram air inlets that are intended to elucidate that the present invention is not limited to the pod-shaped ram air inlet shown. On the contrary, it would be conceivable to use all types of ram air inlets that in some way make it possible to take in and route ram air into a pipe or a duct.

As a supplement, it should be noted that "comprising" does not exclude any other elements or steps, and that "a" or "an" does not exclude a plurality. It should furthermore be noted that characteristics that were described with reference to one of the above exemplary embodiments can also be used in combination with other characteristics of other above-described exemplary embodiments. Reference symbols in the claims should not be interpreted in a restrictive sense.

REFERENCE SYMBOLS

2 Fresh air inlet
4 Aircraft fuselage
6 Ram air inlet opening
8 Direction of flight
10 Deflector shield
12 Hinge
14 Actuator
16 Ram air duct
18 Compressor
20 Ram air inlet
22 Ram air inlet duct 24 Direction of flight
26 Secondary air inlet opening
28 Secondary air inlet duct
30 Flap
32 Hinge
33 Rotary actuator
34 Outer surface of aircraft
36 Ram air inlet opening
38 Fresh air duct
40 Check valve
41 Possible heat exchanger position
42 Compressor
44 Ram air surface
46 Surge limit
48 Compressor operating point
50 New compressor operating point
52 Emergency ventilation duct
54 Emergency ventilation inlet flap
56 Hinge
57 Rotary actuator
58 Check valve

The invention claimed is:

1. A fresh air inlet for an aircraft, comprising:
at least one ram air inlet including at least one ram air inlet opening;
at least one secondary air inlet opening spaced apart from the at least one ram air inlet;
at least one movably mounted flap;
a secondary air inlet duct connected to the at least one secondary air inlet opening;
a ram air inlet duct connected to the at least one ram air inlet opening;
a fresh air duct; and
a check valve arranged in the secondary air inlet duct;
wherein the at least one movably mounted flap is movable between a first position and a second position;
wherein the at least one movably mounted flap substantially covers the at least one secondary air inlet opening in the first position while keeping the at least one ram air inlet substantially open and, in the second position, at least partially opens the at least one secondary air inlet opening and at least partially extends into an air flow directed toward the at least one ram air inlet opening in order to shield the at least one ram air inlet opening from foreign matter; and
wherein the secondary air inlet duct and the ram air inlet duct are connectable to the fresh air duct.

2. The fresh air inlet of claim 1, wherein the at least one secondary air inlet opening is positioned upstream of the at least one ram air inlet.

3. The fresh air inlet of claim 1, wherein the at least one movably mounted flap is positioned upstream of the at least one ram air inlet and the at least one secondary air inlet opening in the first position.

4. The fresh air inlet of claim 1, wherein the at least one movably mounted flap is positioned between the at least one ram air inlet and the at least one secondary air inlet opening in the first position.

5. The fresh air inlet of claim 1, wherein the at least one movably mounted flap is movable to a third position, in which the at least one movably mounted flap at least partially extends into an air flow in order to route ram air into the at least one secondary air inlet opening from a surface of the aircraft and without substantially impairing an air flow directed toward the at least one ram air inlet opening.

6. The fresh air inlet of claim 1, wherein a cross-sectional surface of the fresh air duct is at least equal to a sum of cross-sectional surfaces of the at least one secondary air inlet duct and the ram air inlet duct.

7. The fresh air inlet of claim 1, further comprising an emergency ventilation duct connectable to the secondary air inlet duct.

8. The fresh air inlet of claim 7, further comprising an emergency ventilation inlet flap movably mounted to the emergency ventilation duct.

9. The fresh air inlet of claim 8, further comprising an actuator for moving the emergency ventilation inlet flap in order to open or close a connection between the emergency ventilation duct and the secondary air inlet duct.

10. The fresh air inlet of claim 1, further comprising a compressor for conveying air in the fresh air duct.

11. The fresh air inlet of claim 1, wherein the at least one movably mounted flap is movably mounted on a hinge.

12. The fresh air inlet of claim 1, further comprising an actuator for moving the at least one movably mounted flap.

13. The fresh air inlet of claim 1, wherein at least one of the fresh air duct, the ram air inlet duct or the secondary air inlet duct is configured to accommodate at least one heat exchanger.

14. The fresh air inlet of claim 1, wherein the at least one movably mounted flap extends outward from the surface of the aircraft.

15. The fresh air inlet of claim 1, wherein the ram air inlet extends outward from an outer contour of the aircraft fuselage.

16. An aircraft comprising at least one fresh air comprising:
at least one ram air inlet including at least one ram air inlet opening;
at least one secondary air inlet opening spaced apart from the at least one ram air inlet;
at least one movably mounted flap;
a secondary air inlet duct connected to the at least one secondary air inlet opening;
a ram air inlet duct connected to the at least one ram air inlet opening;
a fresh air duct; and
a check valve arranged in the secondary air inlet duct;
wherein the at least one movably mounted flap is movable between a first position and a second position;
wherein the at least one movably mounted flap substantially covers the at least one secondary air inlet opening in the first position while keeping the at least one ram air inlet substantially open and, in the second position, at least partially opens the at least one secondary air inlet opening and at least partially extends into an air flow directed toward the at least one ram air inlet opening in order to shield the at least one ram air inlet opening from foreign matter; and
wherein the secondary air inlet duct and the ram air inlet duct are connectable to the fresh air duct.

* * * * *